(12) United States Patent
Flack et al.

(10) Patent No.: US 9,529,420 B2
(45) Date of Patent: Dec. 27, 2016

(54) TRANSITIONING BETWEEN TWO POWER STATES BASED ON USER RELATED SIGNALS

(71) Applicant: Google Inc., Mountain View, CA (US)

(72) Inventors: Robert Flack, Toronto (CA); Alexander Friedrich Kuscher, San Francisco, CA (US)

(73) Assignee: Google Inc., Mountain View, CA (US)

( * ) Notice: Subject to any disclaimer, the term of this patent is extended or adjusted under 35 U.S.C. 154(b) by 91 days.

(21) Appl. No.: 14/568,004

(22) Filed: Dec. 11, 2014

(65) Prior Publication Data

US 2016/0170477 A1   Jun. 16, 2016

(51) Int. Cl.
  *G06F 1/32*  (2006.01)
  *G06F 21/31*  (2013.01)

(52) U.S. Cl.
  CPC .............. *G06F 1/3296* (2013.01); *G06F 21/31* (2013.01)

(58) Field of Classification Search
  CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
  See application file for complete search history.

(56) References Cited

U.S. PATENT DOCUMENTS

| | | |
|---|---|---|
| 7,107,455 B1 | 9/2006 | Merkin |
| 7,865,746 B2 | 1/2011 | Bozek et al. |
| 8,244,200 B2 | 8/2012 | Orr et al. |
| 8,375,422 B2 | 2/2013 | Sennett et al. |
| 8,655,419 B2 | 2/2014 | Armstrong et al. |
| 8,868,922 B2* | 10/2014 | Marshall ............ G07C 9/00309 713/185 |
| 9,021,270 B1* | 4/2015 | Byers .................. H04L 63/0861 713/186 |
| 2010/0313050 A1 | 12/2010 | Harrat et al. |
| 2011/0080349 A1* | 4/2011 | Holbein ................ G06F 1/3203 345/173 |

(Continued)

FOREIGN PATENT DOCUMENTS

EP           1437639 A2    7/2004
WO   WO-2014/101553 A1    7/2014

*Primary Examiner* — Zahid Choudhury
(74) *Attorney, Agent, or Firm* — McDermott Will & Emery LLP (57) ABSTRACT

Systems, methods, and machine-readable media transitioning between two power states based on user-related signals are provided. A computing device in a first power state may monitor multiple sensors and receive first sensor signals from a first group of the sensors. One or more radio frequency (RF) signals may be received from one or more nearby communication devices. The first sensor signals may be used to determine that the computing device has been picked up and, in response, an application processor maybe activated. The application processor may select a second power state based on the first power state and the first sensor signals. The second power state includes a power on state when the first power state is a suspended power state and the first sensor signals indicate that the computing device has been picked up while being touched on a screen. The computing device is transitioned to the second power state.

16 Claims, 5 Drawing Sheets

(56) References Cited

U.S. PATENT DOCUMENTS

| | | | |
|---|---|---|---|
| 2012/0062470 A1* | 3/2012 | Chang | G06F 1/3262 345/173 |
| 2012/0235790 A1* | 9/2012 | Zhao | G06F 21/32 340/5.83 |
| 2013/0063611 A1* | 3/2013 | Papakipos | G06F 1/1686 348/207.11 |
| 2014/0120832 A1 | 5/2014 | Confer et al. | |

* cited by examiner

TRANSITIONING BETWEEN TWO POWER STATES BASED ON USER RELATED SIGNALS

BACKGROUND

World-wide application of hand-held communication devices such as smart phones, tablets, and phablets are ever increasing, and features of these devices are improving in a very fast pace. Oftentimes, devices of a new generation of a hand-held communication device, in spite of offering enhanced features such as more processing power, faster, more power efficiency, and other desirable features, are more compact and cost efficient. The new generations are also expected to be smarter, for example, by using various sensors and include more security features while being more user-friendly.

SUMMARY

The present description relates generally to transitioning between two power states of a computing device based on user-related signals.

In one or more general aspects of the subject technology, a computer implemented method is described. The method includes monitoring, by a computing device in a first power state, a plurality of sensors, receiving, based on the monitoring, first sensor signals from a first group of the plurality of sensors, receiving one or more radio frequency (RF) signals from one or more nearby communication devices, and, in response to receiving the first sensor signals, determining based on the first sensor signals that the computing device has been picked up. The method further includes, in response to the determination, activating an application processor of the computing device. The method also includes selecting, by the application processor, a second power state based on the first power state and the first sensor signals. The second power state includes a power on state when the first power state is a suspended power state and the first sensor signals indicate that the computing device has been picked up while being touched on a screen of the computing device. The second power state includes an active state when the first power state is a hibernation power state and the one or more RF signals indicate that the computing device has been picked up by an authorized user of the computing device. The computing device may be transitioned to the second power state.

In some implementations, in the power on state the computing device is not ready to be used without user authentication, and in the active state the computing device is ready to be used without user authentication. In some aspects, the second power state includes the active state when the first power state is a suspended power state, the first sensor signals indicate that the computing device has been picked up while being touched on the screen, and the one or more RF signals indicate that the computing device has been picked up by the authorized user of the computing device.

Implementations may include receiving, based on the monitoring, second sensor signals from a second group of the plurality of sensors, and in response to receiving the second sensor signals and the one or more RF signals, transitioning the computing device from the second power state to a third power state. In one or more aspects, the first group of the plurality of sensors includes a touch sensor, a gyroscope, and an accelerometer. And, the second group of the plurality of sensors includes a camera, a proximity sensor, the gyroscope, and the accelerometer. The third power state may include a hibernation power state when the second sensor signals indicate that the computing device has been left in a first state for a first predetermined length of time and the one or more RF signals are received from a communication device associated with the authorized user of the computing device. The first state may be characterized by detection of signals indicating at least one of a screen of the computing device being left in a predetermined position or not being looked at.

In one or more implementations, the third power state includes a suspended power state when the computing device is left in the first state for a second predetermined length of time, is in a second state, or no RF signals are received from a communication device associated with the authorized user of the computing device. The second state may include at least one of the computing devices being moved at a speed higher than a threshold speed or the screen of the computing device being proximate to a surface. The second predetermined length of time may be greater than the first predetermined length of time. In some aspects, the one or more RF signals may indicate that the computing device has been picked up by the authorized user of the computing device based at least on one RF signal received from a device currently being used by the authorized user. Examples of the device currently being used by the authorized user includes a smart watch worn by the authorized user or one of a smart phone, a tablet, or a laptop computer being in close proximity of the computing device.

According to some other general aspects of the subject technology, a computing device includes a sensor-monitoring hub, a network interface, a state machine, an application processor, and a power monitor. The sensor-monitoring hub may be configured to monitor a plurality of sensors and based on the monitoring, receive first sensor signals from a first group of the plurality of sensors. The sensor-monitoring hub, in response to receiving the first sensor signals, may process the first sensor signals to generate a first status signal. The network interface may be configured to receive one or more RF signals from one or more nearby communication devices. The state machine may be configured to determine a power state of the computing device. The application processor may be configured to select a second power state based on a first power state determined by the state machine and the first status signal. In some aspects, the second power state includes a power on state when the first power state is a suspended power state and the first status signal indicates that the computing device has been picked up while being touched on a screen of the computing device. The power module may be configured to transition the computing device to the second power state.

In some implementations, in the power-on state the computing device is not ready to be used without user authentication, and in the active state the computing device is ready to be used without user authentication. The application processor may be configured to process the one or more RF signals. In one or more aspects, the second power state may include an active state when the first power state is a hibernation power state and the first status signal indicates that the computing device has been picked up by an authorized user of the computing device, or the first power state is a suspended power state, the first status signal indicates that the computing device has been picked up while being touched on the screen, and the one or more RF signals indicate that the computing device has been picked up by the authorized user of the computing device.

In some implementations, the sensor-monitoring hub may be configured to receive, based on the monitoring, second sensor signals from a second group of the plurality of sensors and to process the second sensor signals and communicate a second status signal to the application processor. The application processor may be configured to cause the power module to transition the computing device from the second power state to a third power state in response to receiving the second status signal and the one or more RF signals. The first group of the plurality of sensors includes a touch sensor, a gyroscope, and an accelerometer, and wherein the second group of the plurality of sensors includes a camera, a proximity sensor, the gyroscope, and the accelerometer.

In one or more implementations, the third power state includes a hibernation power state when the second status signal indicates that the computing device has been left in a first state for a first predetermined length of time and the application processors determine that the one or more RF signals are received from a communication device associated with the authorized user of the computing device. The first state may be characterized by detection of signals indicating at least one of a screen of the computing device being left in a predetermined position or not being looked at. In some aspects, the third power state includes a suspended power state when the second status signal indicates that the computing device is left in the first state for a second predetermined length of time, is in a second state, or the application processor determines that no RF signals are received from a communication device associated with the authorized user of the computing device. The computing device may be in the second state when the second status signal indicates at least one of the computing devices is being moved at a speed higher than a threshold speed or the screen of the computing device being proximate to a surface. The second predetermined length of time is greater than the first predetermined length of time.

In some implementations, the application processor may be configured to process the one or more RF signals and determine that the computing device has been picked up by the authorized user of the computing device based at least on one RF signal received from a device currently being used by the authorized user. Examples of the device currently being used by the authorized user includes a smart watch worn by the authorized user or one of a smart phone, a tablet, or a laptop computer being in close proximity of the computing device.

According to some other general aspects of the subject technology, a system may include a plurality of communication devices and a computing device that communicates through a local network with the plurality of communication devices. The computing device may include a sensor-monitoring hub coupled to a plurality of sensors, a network interface, an application processor, and a power module. The sensor-monitoring hub may be configured to receive first sensor signals from a first group of the plurality of sensors and to generate first status signals based on processing the first sensor signals. The network interface may be configured to receive one or more RF signals from one or more of the plurality of communication devices. The application processor may be configured to receive the first status signal and one or more RF signals, process the one or more RF signals, receive a power state of the computing system from a state machine, and select a second power state based on the power state and the first status signal. The second power state may include an active state when the power state is a hibernation power state and the one or more RF signals indicate that the computing device has been picked up by an authorized user of the computing device. The power module may be configured to transition the computing device to the second power state.

In some implementations, the second power state includes a power on state when the power state is a suspended power state and the first status signal indicates that the computing device has been picked up while being touched on a screen of the computing device. In some aspects, the second power state includes the active state when the power state is a suspended power state, the first status signal indicates that the computing device has been picked up while being touched on the screen, and the one or more RF signals indicate that the computing device has been picked up by the authorized user of the computing device.

In some aspects, the sensor-monitoring hub is configured to receive second sensor signals from a second group of the plurality of sensors and to process the second sensor signals and communicate a second status signal to the application processor. The application processor may be configured to cause the power module to transition the computing device from the second power state to a third power state, in response to receiving the second status signal and the one or more RF signals. In one or more aspects, the third power state includes a hibernation power state when the second status signal indicates that the computing device has been left in a first state for a first predetermined length of time and the application processors determines that the one or more RF signals are received from a communication device associated with the authorized user of the computing device. The first state may be characterized by detection of signals indicating at least one of a screen of the computing device being left in a predetermined position or not being looked at.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

In one or more implementations of the subject technology, a computing device may be transitioned between two power states based on user-related signals. The two power states may include two power states from a list including a suspended power state (e.g., off state), a hibernation state, a power on state, and an active state. In the on state, the user may need to be authenticated before using the computing device, whereas in the active state the device may be on and ready to be used without the need for user authentication, for example.

Figure 1:
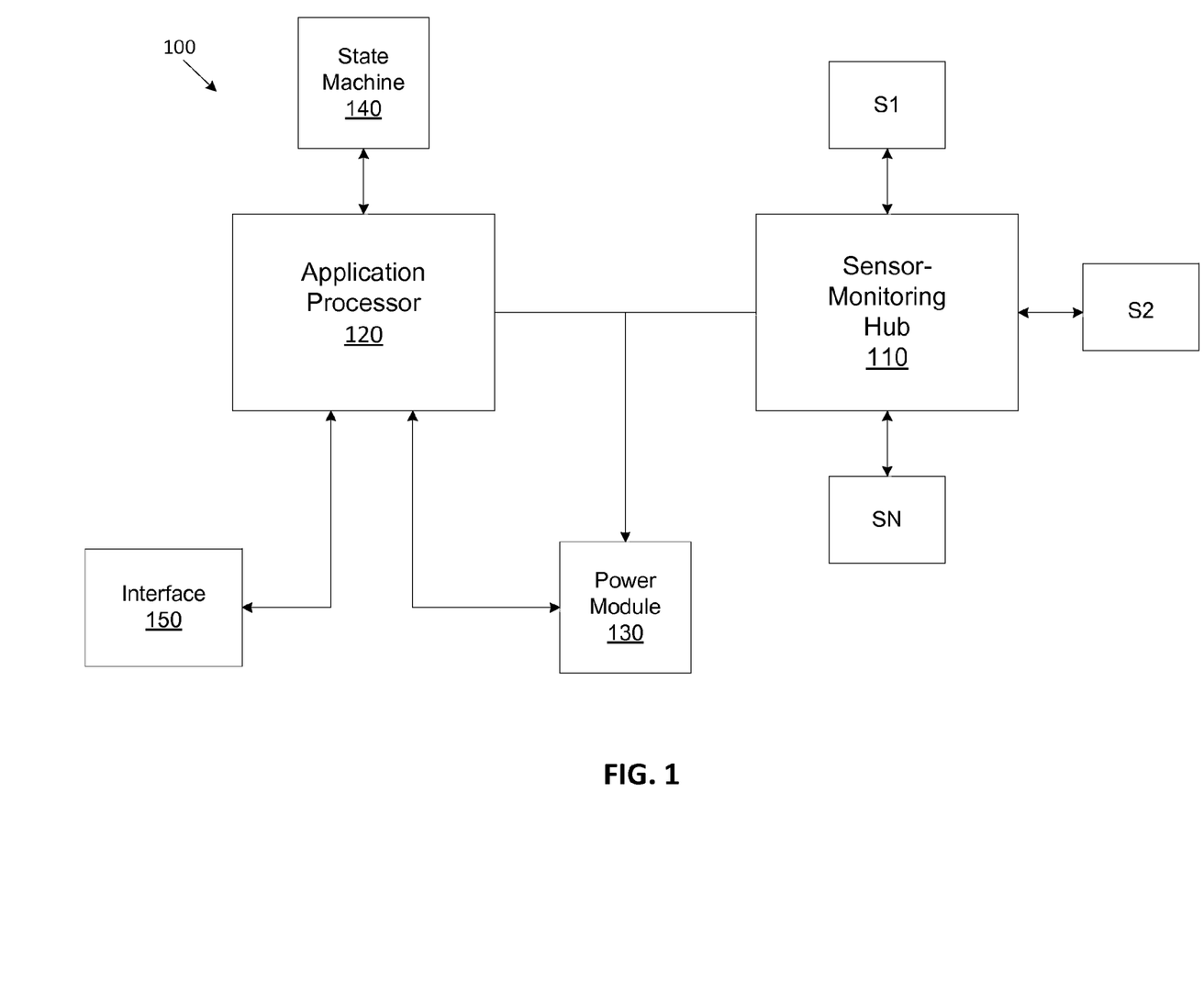
FIG. 1 is a conceptual diagram illustrating an example of a computing device that transitions between two power states based on user-related signals, in accordance with one or more aspects of the subject technology.

FIG. 1 is a conceptual diagram illustrating an example of a computing device 100 that transitions between two power states based on user-related signals, in accordance with one or more aspects of the subject technology. Examples of the computing device 100 include, but are not limited to, a tablet, a phablet, a smart phone, or any other hand held computing device. The computing device 100 includes, but is not limited to, a sensor monitoring hub 110, a number of sensors S1, S2 ... SN coupled to the sensor monitoring hub 110, an application processor 120, a power module 130, a state machine 140, and an interface 150 (e.g., a communication interface, such as a network interface). In some aspects, the sensors S1, S2 ... SN include a touch sensor, a gyroscope, an accelerometer, a camera, a proximity sensor, and other sensors that can provide information regarding a status of the computing device. The sensors S1, S2 ... SN are known sensor devices. For example, the touch sensor may be integrated with the screen of the computing device 100 and may provide a signal when any portion of the screen is touched. The gyroscope may be configured to use Earth's gravity to provide a signal that determines an orientation of the computing device 100. The accelerometer is configured to measure non-gravitational acceleration and an accelerometer's signal is a measure of a vibration associated with a movement of the device from a standstill to any velocity. For example, if the computing device 100 is picked up, both the accelerometer and the gyroscope provide signals to the sensor monitoring hub 110. The proximity sensor may detect a presence of a nearby object without physical contact. For instance, when the computing device is carried in a handbag, the proximity sensor may provide a signal indicating the presence of other objects including, at least, a fabric of the handbag.

The sensor signals from the sensors S1, S2 ... SN are received and processed by the sensor monitoring hub 110 as a part of the user-related signals based on which the computing device 100 may transition between two power states. The other part of the user-related signals may be received from a number of nearby communication devices associated with a user of the computing device 100, the RF or other (e.g., optical) signals of which are received by the interface 150 and processed by the application processor 120. These signals are used by the application processor 120 to decide about a transition between two power states.

In some implementations, the interface 150 is a known module and is configured to facilitate communication with the nearby communication devices (e.g., a digital video recorder (DVR), a digital TV, an access point, a laptop computer, a desktop computer, or any other wireless-enabled device) associated with the user of the computing device 100.

The state machine 140 may be configured to provide information related to a current power state of the computing device 100, as described in more details herein. The power states of the computing device 100 includes a power-on state, a power-off (also referred to as "suspended power") state, a hibernation state, and an active state. The power-on state is different from the active state in the sense that in the active state the computing device 100 is on and ready to be used without the need for user authentication (e.g., username and password entry). It is understood that when the computing device in not ready for use the user would not be able to access any information or input any information to the device, although the power is on. When in the power-on state, the user of the computing device 100 has to proceed with authentication before being able to use the device. The power module 130 can transition the computing device 100 between two power states based on user-related signals as interpreted by the sensor monitoring hub 110 and the application processor 120.

In one or more implementations, the sensor-monitoring hub 110 may be configured to monitor the sensors (e.g. S1, S2 ... SN) and based on the monitoring, receive sensor signals from the sensors. The sensor-monitoring hub 110 may perform monitoring, for example, actively by periodically requesting information from sensors via sending requests for status to sensors. The sensor-monitoring hub 110 may perform monitoring passively, for example, by waiting to receive status information from sensors. In some aspects, each sensor may be configured to automatically (e.g., periodically) push signals, e.g., send signals to the sensor-monitoring hub 110. In some implementations, the sensor-monitoring hub 110 may include an embedded controller (EC) such as a controller with a dedicated read-only memory (ROM) including firmware that can be executed by the EC. The EC may be a low power controller and can wake up the application processor 120 from a hibernation state. In some aspects, the EC may be a slow processor that is capable of performing some simple processing on the EC's inputs to determine an appropriate time for waking up the application processor 120. For example, these inputs may be used to trigger an interrupt on the EC either whenever there is a new sensor value or based on a threshold value. In some aspects, the EC may determine based on the set of the most recently received sensor values whether or not it is the appropriate time to wake up the application processor 120.

In one or more implementations, the sensor-monitoring hub 110 may process the sensor signals to make a determination about a physical status of the computing device 100 and send a status signal to the application processor 120. The processing may be performed by a hardware or firmware integrated in the sensor-monitoring hub 110. The sensor-monitoring hub 110 has to be always in power-on mode, even when other components of the computing device may be in hibernation or sleep mode.

In some implementations, the application processor 120 may include suitable hardware, firmware, and/or codes to process information received from the sensor-monitoring hub 110, the state machine 140, and the interface 150 and to cause the power module 130 to transition the computing device 100 between two power states. In some aspects, the application processor 120 may be implemented as a dedicated processor or as part of a general processor of the computing device 100. The power module 130 may include suitable hardware, firmware, and/or codes to process commands from the application processor 120 and execute these commands to transition the computing device 100 between two power states. For example, the power module 130 may be the controller that is coupled to a power management module of the computing device 100 that makes the actual transition possible. In one or more implementations, the power module 130 may include a power controller capable of performing boot, suspend, sleep, and other power status changes, as instructed by the application processor 120 and/or the EC. Following the execution of the command, the power module 130 may send a signal to the application processor 120 indicating successful transitioning of the computing system 100 to a new power state. The application processor 120, in turn, reports the new power state of the computing device 100 to the state machine 140 to change the current power state of the computing system 100 to the new power state.

In one or more implementations, the sensor-monitoring hub 110 may receive first signals from a first group of sensors (e.g., the touch sensor, the gyroscope, and the accelerometer). In response to receiving the first sensor signals, the sensor-monitoring hub 110 may process the first sensor signals and generate a first status signal. The sensor-monitoring hub 110 may also activate the application processor 120, which may be off or inactive for power saving purposes. The application processor 120 may select a second power state based on a first power state determined by the state machine and the first status signal. In some aspects, the second power state includes a power-on state when the first power state is a power-off state and the first status signal indicates that the computing device 100 has been picked up while being touched on the screen of the computing device 100. Following the selection of the second state, the application processor may cause the power module 130 to transition the computing device 100 to the second power state (e.g., the power-on state). Because it is not clear whether the user who picked up the computing device 100 is the authorized user of the device, the computing device 100 is turned on but the user has to go through the authentication process to prevent unauthorized use of the device.

In some aspects, the second power state is the active state when it is made sure the user who picked up the computing device was the authorized user based on signals (e.g., RF signals or other signals such as optical signals) from the nearby communication devices. For example, if the first power state is a suspended power state, the first sensor signals indicate that the computing device has been picked up while being touched on the screen, and the one or more RF signals indicate that the computing device has been picked up by the authorized user of the computing device, the computing device 100 is transitioned to the active state.

In some implementations, the sensor-monitoring hub 110 may receive second sensor signals from a second group of the sensors (e.g., the camera, the proximity sensor, the gyroscope, and the accelerometer), process the second sensor signals and communicate a second status signal to the application processor 120. The application processor 120 may cause the power module 130 to transition the computing device 100 from the second power state to a third power state, in response to receiving the second status signal and one or more signals (e.g., RF signals or other signals such as optical signals). The third power state is a hibernation power state when the second status signal indicates that the computing device has been left in a first power state for a first predetermined length of time and the application processors determine that one or more of the signals are received from a communication device associated with the authorized user of the computing device. The first state may be characterized by detection of signals indicating one of the screens of the computing device 110 being left in a predetermined position (e.g., face down) or not being looked at. In some aspects, the third power state includes a suspended power state when the second status signal indicates that the computing device 100 is left in the first state for a second predetermined length of time, is in a second state, or the application processor determines that no signals are received from a communication device associated with the authorized user of the computing device. The computing device may be in the second state when the second status signal indicates at least one of the computing devices is being moved (e.g., is in a moving vehicle such as a car) at a speed higher than a threshold speed (optionally definable by the user) or the screen of the computing device being proximate to a surface (e.g., a top of a hard surface such as a surface of a table or a desk, or the surface of another object when the computing device is being carried in a handbag). The second predetermined length of time is greater than the first predetermined length of time. The first and second predetermined lengths of time may have defaults values (e.g., 5 minutes and 30 minutes or other values, respectively) that can be optionally defined by the user of the computing device 100.

In some implementations, the application processor 120 may determine based on the one or more signals that the computing device 100 has been picked up by the authorized user of the computing device, for example, if the one or more signals are received from a device currently being used by the authorized user. For instance, if the RF signal is received from a smart watch worn by the authorized user or from another device such as a smart phone, a tablet, or a laptop computer located in a close proximity of (e.g., on the same table or desk or in the same room with) the computing device 100.

Figure 2:
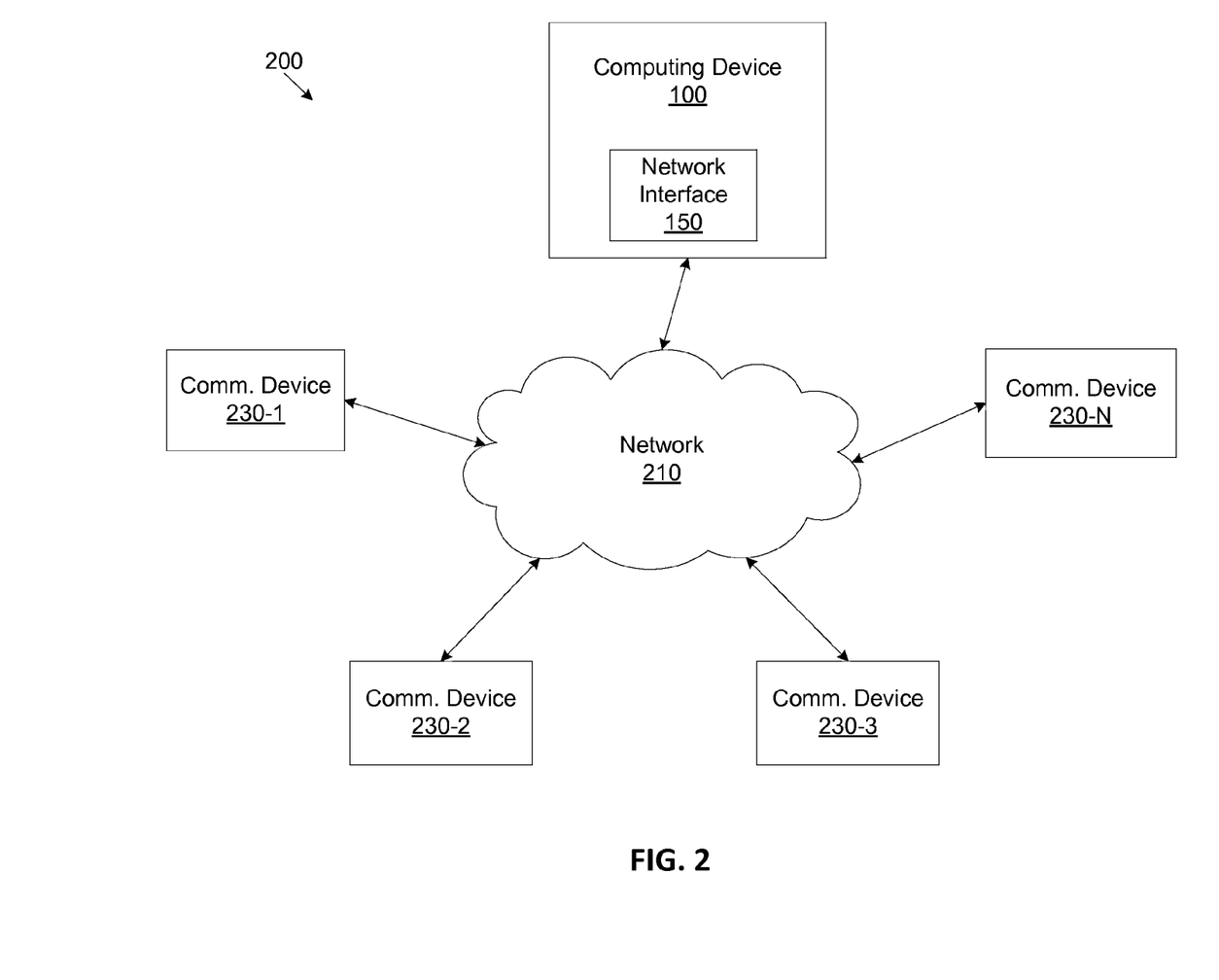
FIG. 2 is a conceptual diagram illustrating an example of a network environment in which the computing device of FIG. 1 operates, in accordance with one or more aspects of the subject technology.

FIG. 2 is a conceptual diagram illustrating an example of a network environment 200 in which the computing device 100 of FIG. 1 operates, in accordance with one or more aspects of the subject technology. The network environment 200 includes a network 210 (e.g., a local area network (LAN), the computing device 100, and a number of communication devices 230 (e.g., 230-1, 230-2 . . . 230-N) associated with an authorized user of the computing device 100. Examples of the communication devices 230 include a DVR, a digital TV, an access point, a laptop computer, a tablet, a phablet, a smart watch, a desktop computer, or any other wireless-enabled device associated with the authorized user of the computing device 100. A device is defined as being associated with the authorized user of the computing device 100 if the device can be enabled or has been once enabled by using authentication information (e.g., user name and password) of the authorized user of the computing device 100.

Figure 3:
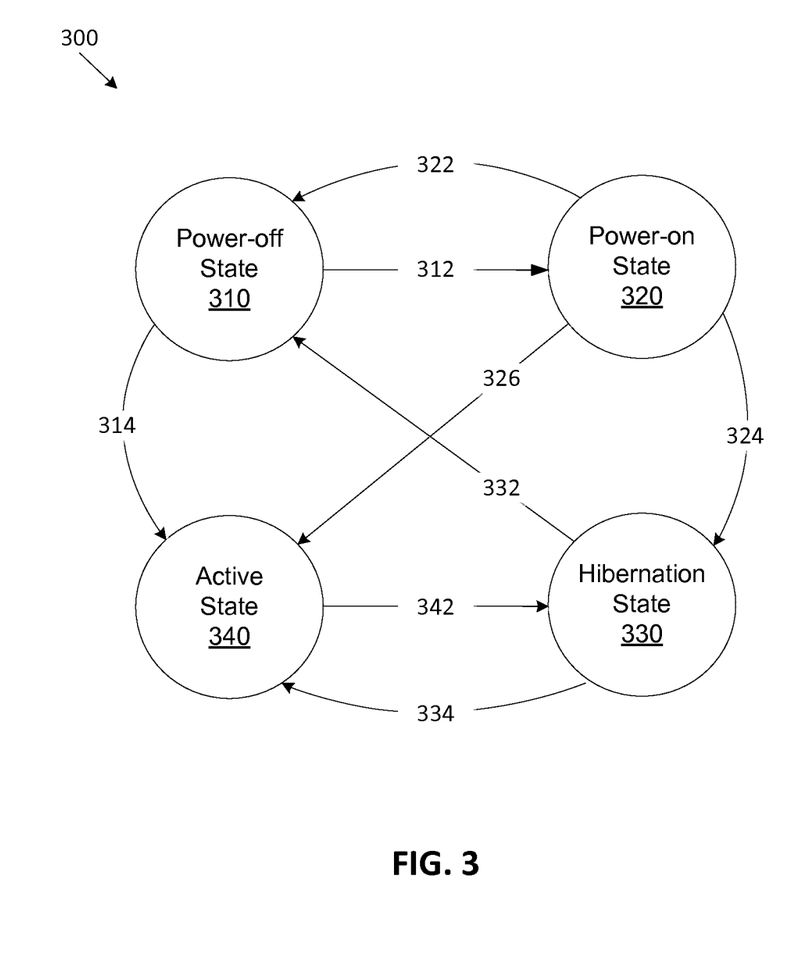
FIG. 3 is a state diagram illustrating various power states of a state machine of the computing device of FIG. 1, in accordance with one or more aspects of the subject technology.

A signal (e.g., an RF signal or another signal such as an optical signal) received by the interface 150 from any of the communication devices 230 may be interpreted by the application processor 120 of FIG. 1 that the computing device is in an environment (e.g., room, house, office, etc.) associated with the authorized user of the computing device 100. For example, if the computing device 110, while being in an active power state, has been left face down or has not being looked at for a first predetermined length of time (e.g., 5 minutes) and a signal is received from one of the communication devices 230, the computing device 100 may be transitioned into in a hibernation state. Otherwise, in the absence of a signal from any of the communication devices 230, for enhanced security, the computing device 100 may be turned off. Various power states of the computing device and the corresponding transitions are described in more detail herein with respect to FIG. 3. FIG. 3 is a state diagram 300 illustrating various power states of the state machine 140 of the computing device 100 of FIG. 1, in accordance with one or more aspects of the subject technology. The power states of the state machine 140 may include a power-off state 310, a power-on state 320, a hibernation state 330, and an active state 430. The state machine 140 may determine a current state of the computing device 100 and report it to the application processor 120 of FIG. 1. The state machine 140 may change the current state of the computing device 100 based on a signal received from the application processor 120 that indicates that the power module 130 has transitioned the computing device 100 to a new power state. In some implementations, the state machine 140 may be an EC that can determine based on current sensor readings when to change states. The state machine 140 may include a data structure of the latest known sensor readings as well as other available information to implement a wakeup logic. For example, the state machine 140 may track that the user has an alarm set at which time the computing device 100 needs to wake up and play a sound, or track a user's trusted device and not wakeup automatically unless the trusted device is also present.

According to some implementations, the transition 312 from the power-off state 310 to the power-on state 320 can happen (other than by turning the power switch on) by the computer device 100 being picked while being touched on the screen (e.g., as detected by the sensors such as the gyroscope, the accelerometer, and the touch sensor). The transition 314 from the power-off state 310 to the active state 340 can take place by the computing device 100 being picked while being touched on the screen and one or more signals (e.g., RF signals or other signals such as optical signals) from one or more communication device 230 of FIG. 2 (e.g., a smart watch worn by the authorized user of the computing device 100) confirms that the computing device 100 was picked up by the authorized user.

In some aspects, while in power-on state 320, the computing device 100 can make a transition 322 to the power-off state 310 if it is left in predetermined position (e.g., face down, as detected by the front camera or a proximity sensor) or not being looked at (e.g., as detected by a camera such as the front camera) for a second predetermined length of time (e.g., more than 30 minutes), or being placed in a handbag (e.g., as detected by the proximity sensor) for a second predetermined length of time. A transition 324 from the power-on state 320 to the hibernation state 330 can occur if the computing device 100 is left in the predetermined position or not being looked at for a first predetermined length of time (e.g., less than 10 minutes). A transition 326 from the power-on state 320 to the active state 340 can occur if the authorized user of the computing device 100 completes the authentication process, or if the computing device 100 is picked up or the screen of the computing device 100 is looked at and at the same time a signal from any of the communication devices 230 is received by the interface 150 of FIG. 1.

In some implementations, while in hibernation state 330, the computing device 100 can make a transition 332 to the power-off state 310 if it is left in that state for the second predetermined length of time or is being placed in a handbag. A transition 334 from the hibernation state 330 to the active state 340 can occur if the computing device 100 has been picked up by an authorized user of the computing device as detected by the appropriate sensors and a signal from one of the communication device 230.

In one or more implementations, a transition 342 from the active state 340 to the hibernation state 330 can take place if the computing device 100 has been left in a predetermined position (e.g., face down) or the screen of the computing device 100 has not been looked at for a first predetermined length of time. One or more other transitions not shown in FIG. 3 may be possible by user intervention such as turning off the device using a power switch.

Figure 4:
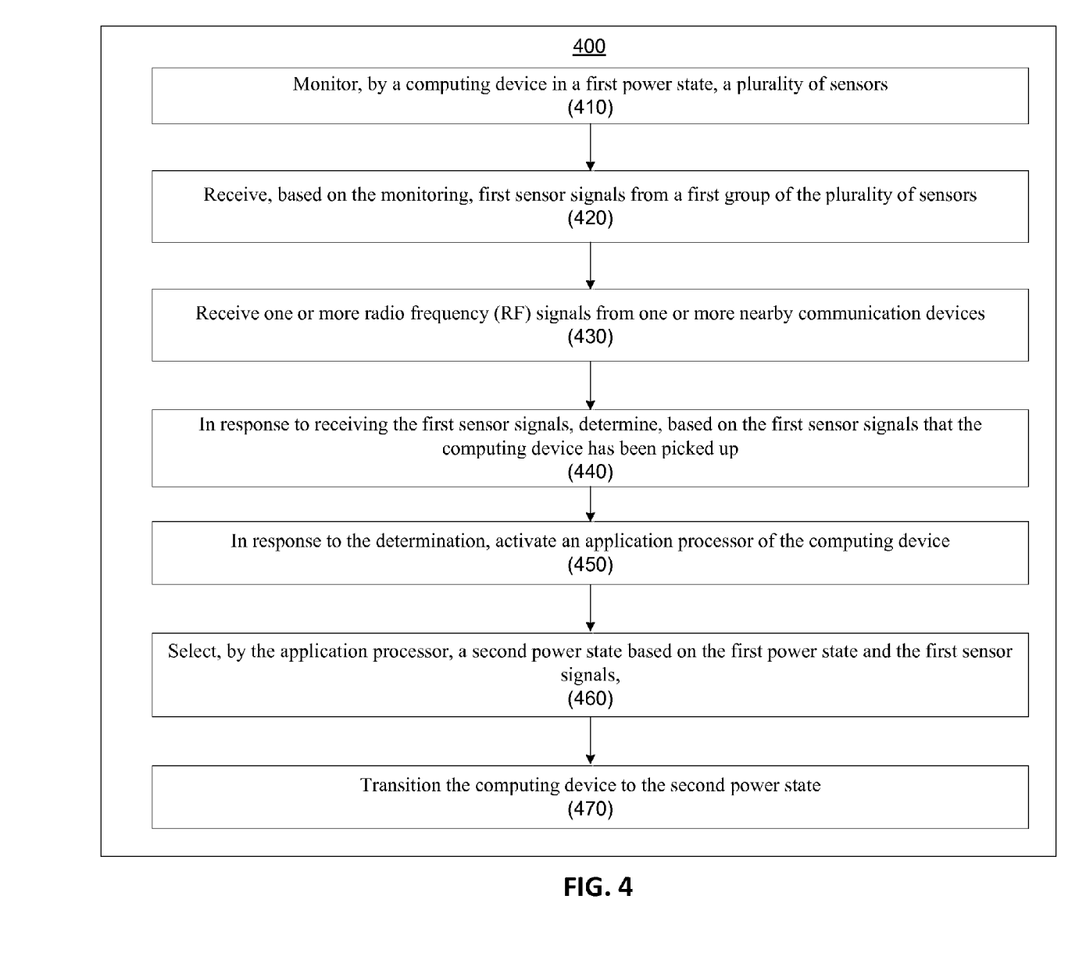
FIG. 4 is a flow diagram illustrating an example of a method for transitioning between two power states of a computing device based on user-related signals, in accordance with one or more aspects of the subject technology.

FIG. 4 is a flow diagram illustrating an example of a method 400 for transitioning between two power states of a computing device based on user-related signals, in accordance with one or more aspects of the subject technology. The method 400 includes an operation block 410, in which a computing device (e.g., 100 of FIG. 1) in a first power state (e.g., one of sates 310, 320, 330 or 340 of FIG. 3) monitors a number of sensors (e.g., S1, S2 . . . SN of FIG. 1). At operation block 420, based on the monitoring, first sensor signals from a first group of the sensors (e.g., a touch sensor, a gyroscope, and an accelerometer) are received. One or more radio frequency (RF) signals from one or more nearby communication devices (e.g., 230 of FIG. 2) are received (operation block 430). In response to receiving the first sensor signals (e.g., by 110 of FIG. 1), at operation block 440, based on the first sensor signals it is determined (e.g., by 110 of FIG. 1) that the computing device has been picked up. At operation block 450, in response to the determination, an application processor (e.g., 120 of FIG. 1) of the computing device is activated. The application processor, at operation block 460, selects a second power state based on the first power state and the first sensor signals. The second power state includes a power-on state (e.g., 320 of FIG. 3) when the first power state is a suspended power state (e.g., 310 of FIG. 3) and the first sensor signals indicate that the computing device has been picked up while being touched on a screen of the computing device. The second power state includes an active state (e.g., 340 of FIG. 3) when the first power state is a hibernation power state (e.g., 330 of FIG. 3) and the one or more signals (e.g., received by 150 of FIG. 1) indicate that the computing device has been picked up by an authorized user of the computing device. At operation block 470, the computing device may be transitioned (e.g., by 130 of FIG. 1) to the second power state.

Figure 5:
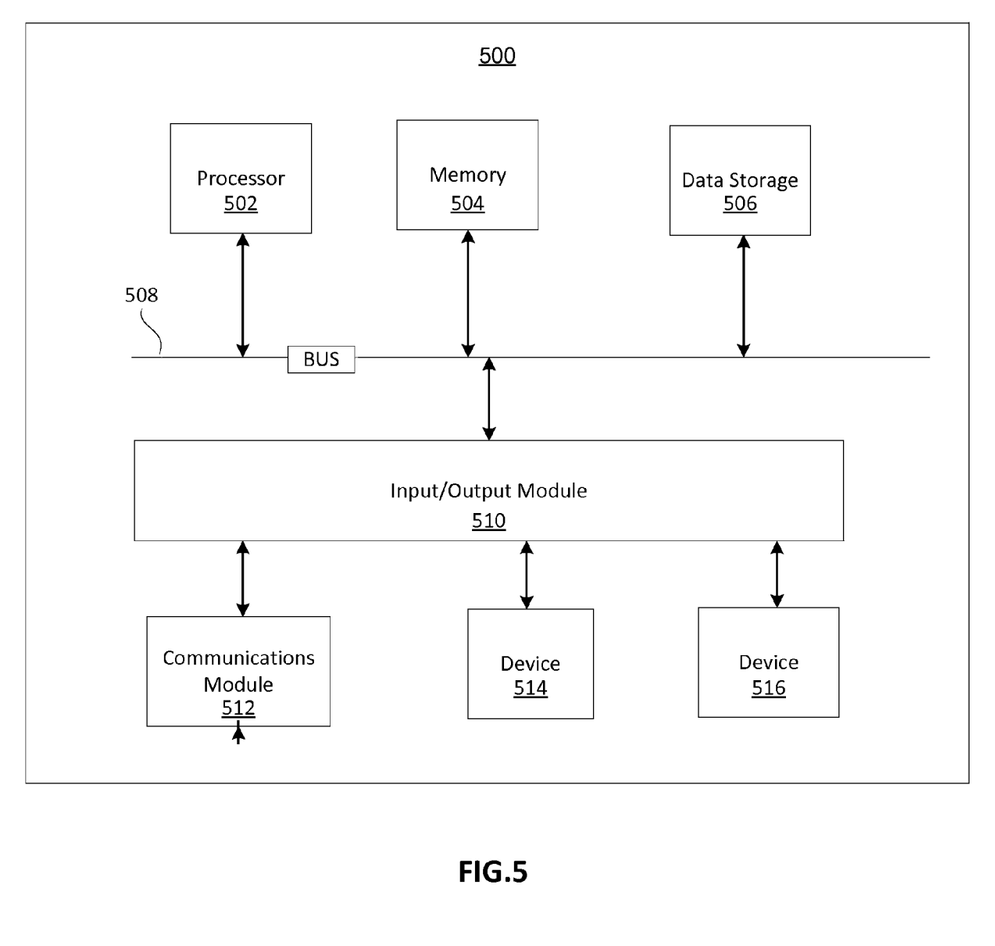
FIG. 5 is a block diagram illustrating an example computer system within which some implementations of the subject technology can be realized.

FIG. 5 is a block diagram illustrating an example computer system 500 within which some implementations of the subject technology can be realized. In certain aspects, the computer system 500 may be implemented using hardware or a combination of software and hardware, either in a dedicated server, or integrated into another entity, or distributed across multiple entities. The computer system 500 (e.g., 100 of FIG. 1 or 230 of FIG. 2) includes a bus 508 or other communication mechanism for communicating information, and a processor 502 coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. In some implementations, the sensor monitoring hub 110, the application processor 120, the state machine 140, and/or the power module 130 of FIG. 1 may be implemented using one or more of the processors 502.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Examples of the input/output module 510 include data ports such as USB ports. The input/output module 510 is configured to connect to a communications module 512. Examples of the communications modules 512 include the interface 150 of FIG. 1 or networking interface cards, such as Ethernet cards and modems. In certain aspects, the input/output module 510 is configured to connect to a plurality of devices, such as an input device 514 and/or an output device 516. Examples of the input devices 514 include a touch screen, a voice recognizing module, or any of the sensors S1-SN of FIG. 1, a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 516 include display devices, such as a LED (light emitting diode), CRT (cathode ray tube), or LCD (liquid crystal display) screen, for displaying information to the user.

According to one aspect of the present disclosure, the processor 502 may execute one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network.

Computing system 500 can include client devices and servers. A client device and a server are generally remote from each other and typically interact through a communication network. The relationship of client device and server arises by virtue of computer programs running on the respective computers and having a client-server relationship to each other.

The term "machine-readable storage medium" or "computer readable medium" as used herein refers to any medium or media that participates in providing instructions or data to processor 502 for execution. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, a floppy disk, a flexible disk, a hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C. To the extent that the term "include," "have," or the like is used in the description or the claims, such term is intended to be inclusive in a manner similar to the term "comprise" as "comprise" is interpreted when employed as a transitional word in a claim.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

It is to be understood that the disclosure is not to be limited to the disclosed embodiments but, on the contrary, is intended to cover various modifications and equivalent arrangements. Those of skill in the art would appreciate that the various illustrative blocks, modules, elements, components, methods, and algorithms described herein may be implemented as electronic hardware, computer software, or combinations of both. Skilled artisans may implement the described functionality in varying ways for each particular application. Various components and blocks may be arranged differently (e.g., arranged in a different order, or partitioned in a different way) all without departing from the scope of the subject technology.

The specific order or hierarchy of steps in the methods disclosed is an illustration of examples of approaches. The specific order or hierarchy of steps in the methods may be rearranged, e.g., based on design preferences. Some of the steps may be performed simultaneously or in an alternative order. Other embodiments are also within the scope of the following claims.

What is claimed is:

1. A computer implemented method comprising:
   monitoring, by a computing device in a first power state, a plurality of sensors;
   receiving, based on the monitoring, first sensor signals from a first group of the plurality of sensors;
   receiving one or more signals from a nearby communication device associated with an authorized user of the computing device;
   in response to receiving the first sensor signals, determining, based on the first sensor signals that the computing device has been picked up;
   in response to the determination, activating an application processor of the computing device;
   selecting, by the application processor, a second power state based on the first power state and the first sensor signals, wherein the second power state comprises a power on state when the first power state is a suspended power state and the first sensor signals indicate that the computing device has been picked up while being touched on a screen of the computing device, and wherein the second power state comprises an active state when the first power state is a hibernation power state;
   transitioning the computing device to the second power state;
   receiving, based on the monitoring, second sensor signals from a second group of the plurality of sensors; and
   in response to receiving the second sensor signals and the one or more signals, transitioning the computing device from the second power state to a third power state,
   wherein the third power state comprises a hibernation power state when the second sensor signals indicate that the computing device has been left in a first state for a first predetermined length of time, and wherein the first state is characterized by detection of signals indicating at least one of a screen of the computing device being left in a predetermined position or not being viewed.

2. The computer implemented method of claim 1, wherein, in the power on state, the computing device is not ready to be used without user authentication, and wherein in the active state the computing device is ready to be used without user authentication.

3. The computer implemented method of claim 1, wherein the second power state comprises the active state when the first power state is a suspended power state, the first sensor signals indicate that the computing device has been picked up while being touched on the screen, wherein the one or more signals comprise one or more radio frequency (RF) signals, and the one or more RF signals indicate that the computing device has been picked up by the authorized user of the computing device.

4. The computer implemented method of claim 1, wherein the first group of the plurality of sensors comprises a touch sensor, a gyroscope, and an accelerometer, and wherein the second group of the plurality of sensors comprises a camera, a proximity sensor, the gyroscope, and the accelerometer.

5. The computer implemented method of claim 1, wherein the third power state comprises a suspended power state when the computing device is left in the first state for a second predetermined length of time, is in a second state, or no signals are received from a communication device associated with an authorized user of the computing device, wherein the second state comprises at least one of the computing device being moved at a speed higher than a threshold speed or the screen of the computing device being proximate to a surface, and wherein the second predetermined length of time is greater than the first predetermined length of time.

6. The computer implemented method of claim 1, wherein at least one signal of the one or more signals is received from a device currently being used by the authorized user, wherein the device currently being used by the authorized user comprises a smart watch worn by the authorized user or one of a smart phone, a tablet, or a laptop computer being in a close proximity of the computing device.

7. A computing device comprising:
a sensor-monitoring hub configured to:
receive first sensor signals from a first group of a plurality of sensors; and
in response to receiving the first sensor signals, process the first sensor signals to generate a first status signal;
an interface configured to receive one or more signals from a nearby communication device associated with an authorized user of the computing device;
a state machine configured to determine a current power state of the computing device;
an application processor configured to select a second power state based on a first power state determined by the state machine and the first status signal, the second power state comprising a power on state when the first power state is a suspended power state and the first status signal indicates that the computing device has been picked up while being touched on a screen of the computing device; and
a power module configured to transition the computing device to the second power state,
wherein the sensor-monitoring hub is configured to receive-second sensor signals from a second group of the plurality of sensors and to process the second sensor signals and communicate a second status signal to the application processor,
wherein the application processor is configured to cause the power module to transition the computing device from the second power state to a third power state, in response to receiving the second status signal and the one or more signals,
wherein the third power state comprises a hibernation power state when the second status signal indicates that the computing device has been left in a first state for a first predetermined length of time, and wherein the first state is characterized by detection of signals indicating at least one of a screen of the computing device being left in a predetermined position or not being viewed.

8. The computing device of claim 7, wherein, in the power on state, the computing device is not ready to be used without user authentication, and wherein in an active state the computing device is ready to be used without user authentication.

9. The computing device of claim 7, wherein:
the one or more signals comprise one or more radio frequency (RF) signals,
the application processor is configured to process the one or more RF signals,
the second power state comprises an active state when:
the first power state is a hibernation power state and the first status signal indicates that the computing device has been picked up by an authorized user of the computing device, or
the first power state is a suspended power state, the first status signal indicates that the computing device has been picked up while being touched on the screen, and the one or more RF signals indicate that the computing device has been picked up by the authorized user of the computing device.

10. The computing device of claim 7, wherein the first group of the plurality of sensors comprises a touch sensor, a gyroscope, and an accelerometer, and wherein the second group of the plurality of sensors comprises a camera, a proximity sensor, the gyroscope, and the accelerometer.

11. The computing device of claim 7, wherein the third power state comprises a suspended power state when the second status signal indicates that the computing device is left in the first state for a second predetermined length of time, is in a second state, or the application processor determines that no signals are received from a communication device associated with an authorized user of the computing device, wherein the computing device is in the second state when the second status signal indicates at least one of the computing device being moved at a speed higher than a threshold speed or the screen of the computing device being proximate to a surface, and wherein the second predetermined length of time is greater than the first predetermined length of time.

12. The computing device of claim 7, wherein the application processor is configured to process the one or more signals and determine that the computing device has been picked up by the authorized user of the computing device based at least on one signal received from a device currently being used by the authorized user, wherein the device currently being used by the authorized user comprises a smart watch worn by the authorized user or one of a smart phone, a tablet, or a laptop computer being in a close proximity of the computing device.

13. A system comprising:
a plurality of communication devices; and
a computing device communicating through a local network with the plurality of communication devices, the computing device comprising:
a sensor-monitoring hub coupled to a plurality of sensors and configured to receive a first sensor signal from a first group of the plurality of sensors and to generate a first status signal based on processing the first sensor signals;
a network interface configured to receive one or more signals from one of the plurality of communication devices associated with an authorized user of the computing device;
an application processor configured to:
receive the first status signal and the one or more signals;
process the one or more signals;
receive a power state of the computing device from a state machine; and
select a second power state based on the power state and the first status signal, the second power state comprising an active state when the power state is a hibernation power state; and a power module configured to transition the computing device to the second power state, wherein the sensor-monitoring hub is configured to receive second sensor signals from a second group of the plurality of sensors and to process the second sensor signals and communicate a second status signal to the application processor, wherein the application processor is configured to cause the power module to transition the computing device from the second power state to a third power state, in response to receiving the second status signal and the one or more signals, wherein the third power state comprises a hibernation power state when the second status signal indicates that the computing device has been left in a first state for a first predetermined length of time, and wherein the first state is characterized by detection of signals indicating at least one of a screen of the computing device being left in a predetermined position or not being viewed.

14. The system of claim 13, wherein the second power state comprises a power on state when the power state is a suspended power state and the first status signal indicate that the computing device has been picked up while being touched on a screen of the computing device.

15. The system of claim 13, wherein the second power state comprises the active state when the power state is a suspended power state, the first status signal indicates that the computing device has been picked up while being touched on a screen of the computing device, and the one or more signals indicate that the computing device has been picked up by the authorized user of the computing device.

16. The system of claim 13, wherein the one or more signals comprise one or more radio frequency (RF) signals, and the one or more RF signals indicate that the computing device has been picked up by the authorized user of the computing device.

* * * * *